US012170412B2

(12) United States Patent
Kim et al.

(10) Patent No.: US 12,170,412 B2
(45) Date of Patent: Dec. 17, 2024

(54) BROADBAND PATCH ANTENNA

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Dongkyu Kim, Seoul (KR); Byung-Wook Min, Seoul (KR); Kyutae Park, Seoul (KR); Donghyun Lee, Gyeonggi-do (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 133 days.

(21) Appl. No.: 17/753,809

(22) PCT Filed: Oct. 17, 2019

(86) PCT No.: PCT/KR2019/013674
§ 371 (c)(1),
(2) Date: Mar. 15, 2022

(87) PCT Pub. No.: WO2021/075602
PCT Pub. Date: Apr. 22, 2021

(65) Prior Publication Data
US 2022/0344822 A1 Oct. 27, 2022

(51) Int. Cl.
*H01Q 9/04* (2006.01)
*H01Q 5/35* (2015.01)

(52) U.S. Cl.
CPC ............. *H01Q 9/0435* (2013.01); *H01Q 5/35* (2015.01); *H01Q 9/0442* (2013.01)

(58) Field of Classification Search
USPC .......................................................... 343/702
See application file for complete search history.

(56) References Cited

U.S. PATENT DOCUMENTS 10,978,779 B2 * 4/2021 Maggay ................ H01L 23/552
2013/0207867 A1 8/2013 Georgescu et al.

FOREIGN PATENT DOCUMENTS

CN 109980338 B * 11/2020
JP 2008-011336 1/2008
(Continued)

OTHER PUBLICATIONS

PCT International Application No. PCT/KR2019/013674, International Search Report dated Jul. 15, 2020, 3 pages.

*Primary Examiner* — Hoang V Nguyen
*Assistant Examiner* — Brandon Sean Woods
(74) *Attorney, Agent, or Firm* — LEE, HONG, DEGERMAN, KANG & WAIMEY

(57) ABSTRACT

A broadband patch antenna comprises a substrate, a ground plate attached to one surface of the substrate, a radiation plate attached to the other surface of the substrate opposite the one surface of the substrate, and a feed line attached to the other surface of the substrate and having one end connected to the radiation plate. The feed line comprises a first line and a second line. The ground plate has the shape of capital "L" having a first groove, a second groove, and a third groove, and may not comprise a portion corresponding to the radiation plate. The first groove is positioned at a first portion which corresponds to a connection portion between the first line and the radiation plate, the second groove is positioned at a second portion which corresponds to a connection portion between the second line and the radiation plate, and the third groove may be positioned so as to be spaced apart from the first groove and the second groove.

6 Claims, 15 Drawing Sheets

(56) References Cited

FOREIGN PATENT DOCUMENTS

| | | | | | |
|---|---|---|---|---|---|
| KR | 10-2009-0118368 | | | 11/2009 | |
| KR | 10-2015-0011711 | | | 2/2015 | |
| KR | 20150011711 | A | * | 2/2015 | ............... H01Q 1/46 |
| KR | 10-1803024 | | | 11/2017 | |

* cited by examiner

【Fig 1】
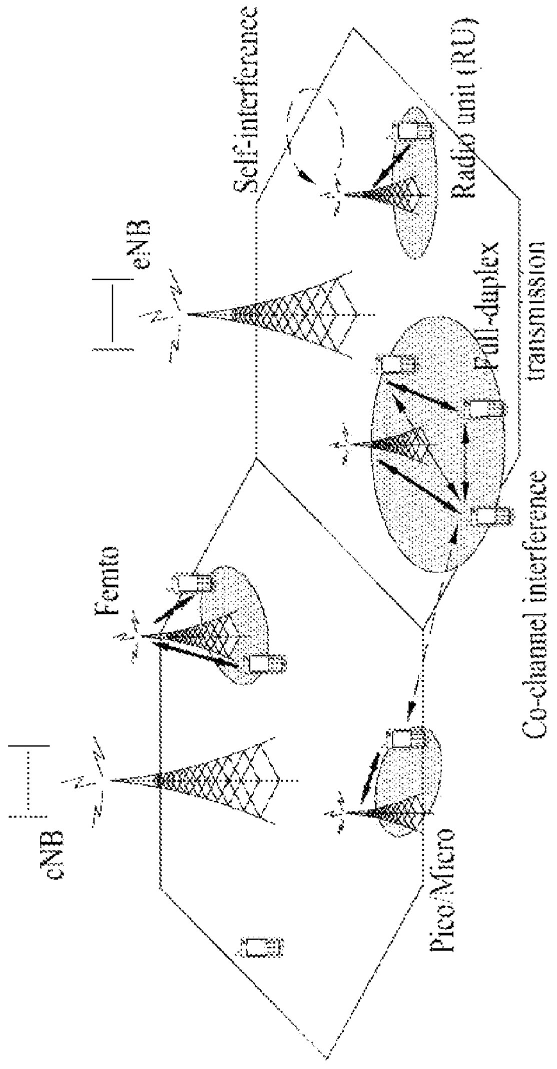

【Fig 2】
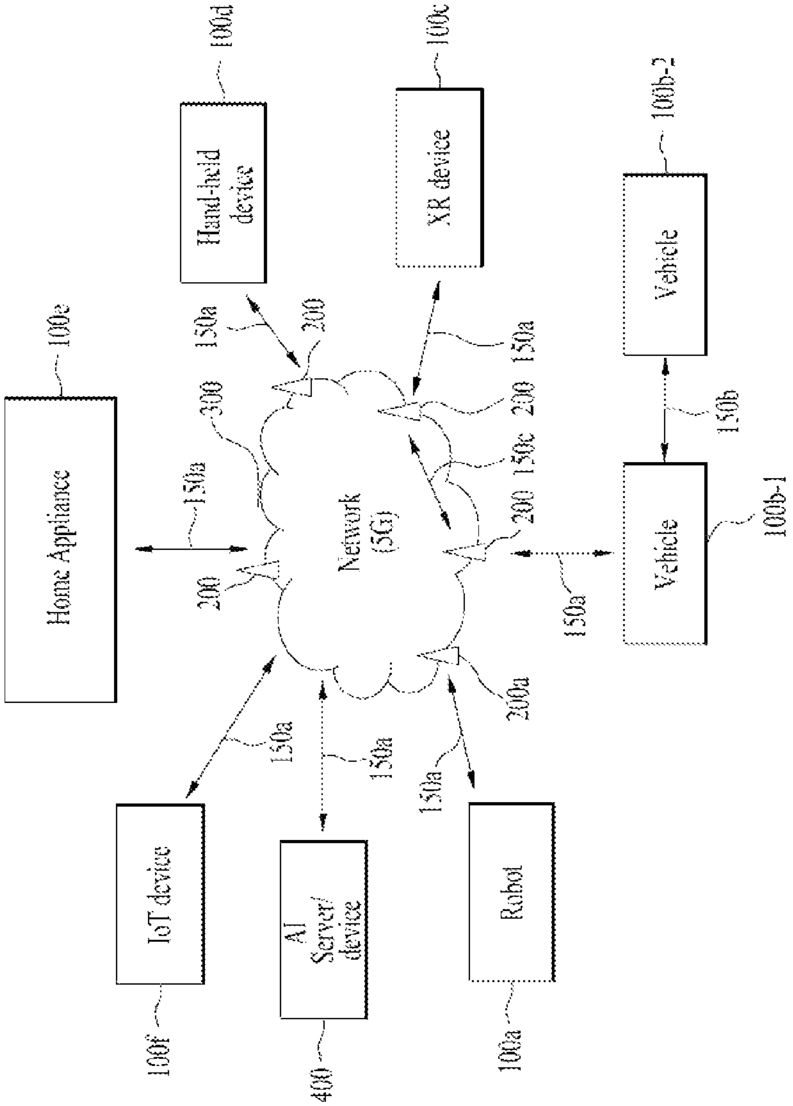

【Fig 3】
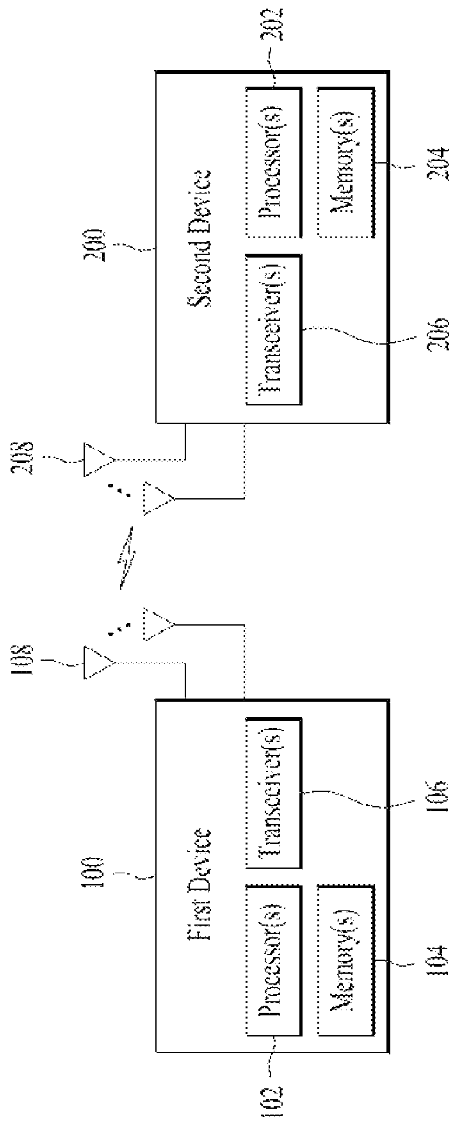

【Fig 4】
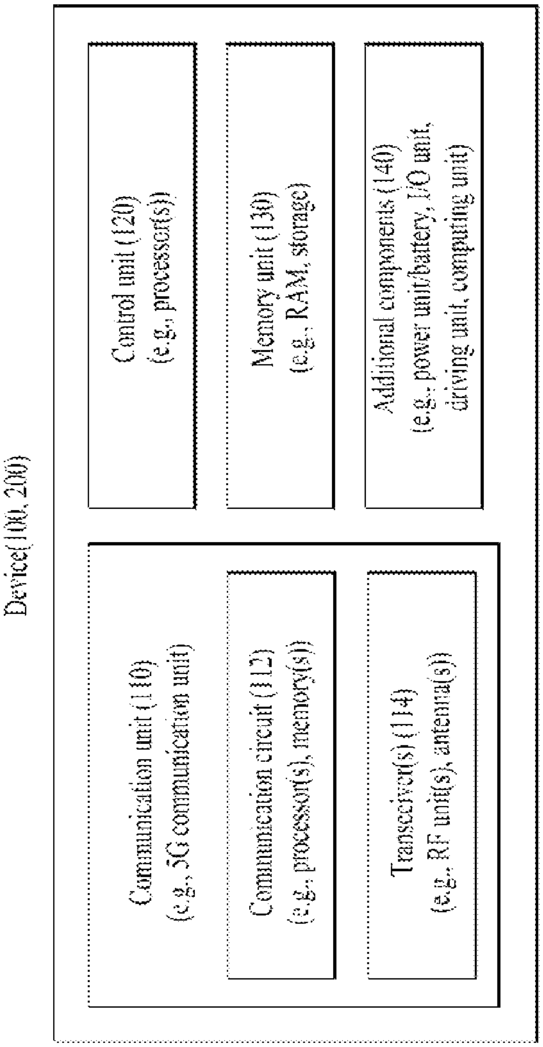

【Fig 5】
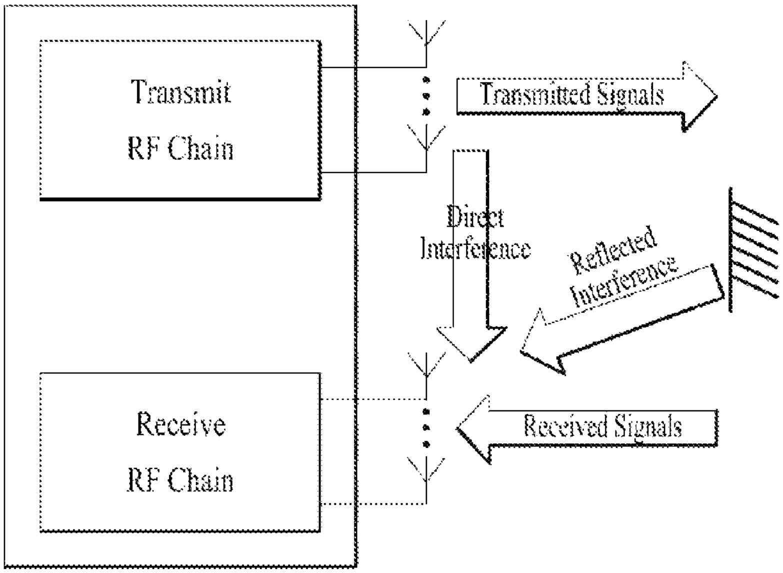

【Fig 6】
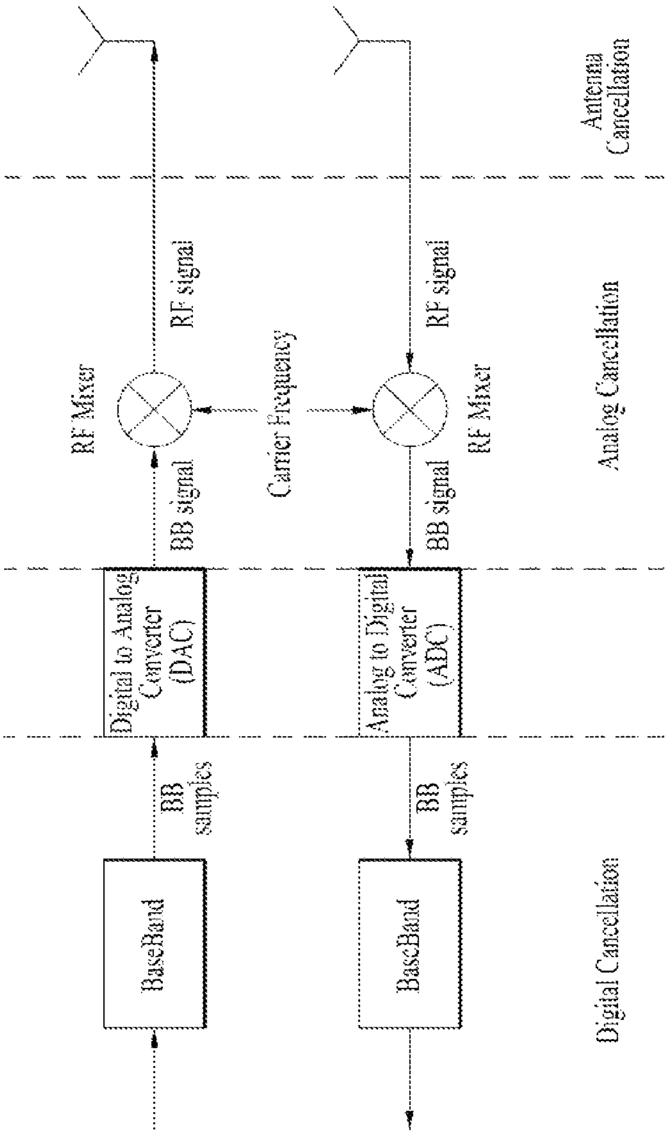

【Fig 7】
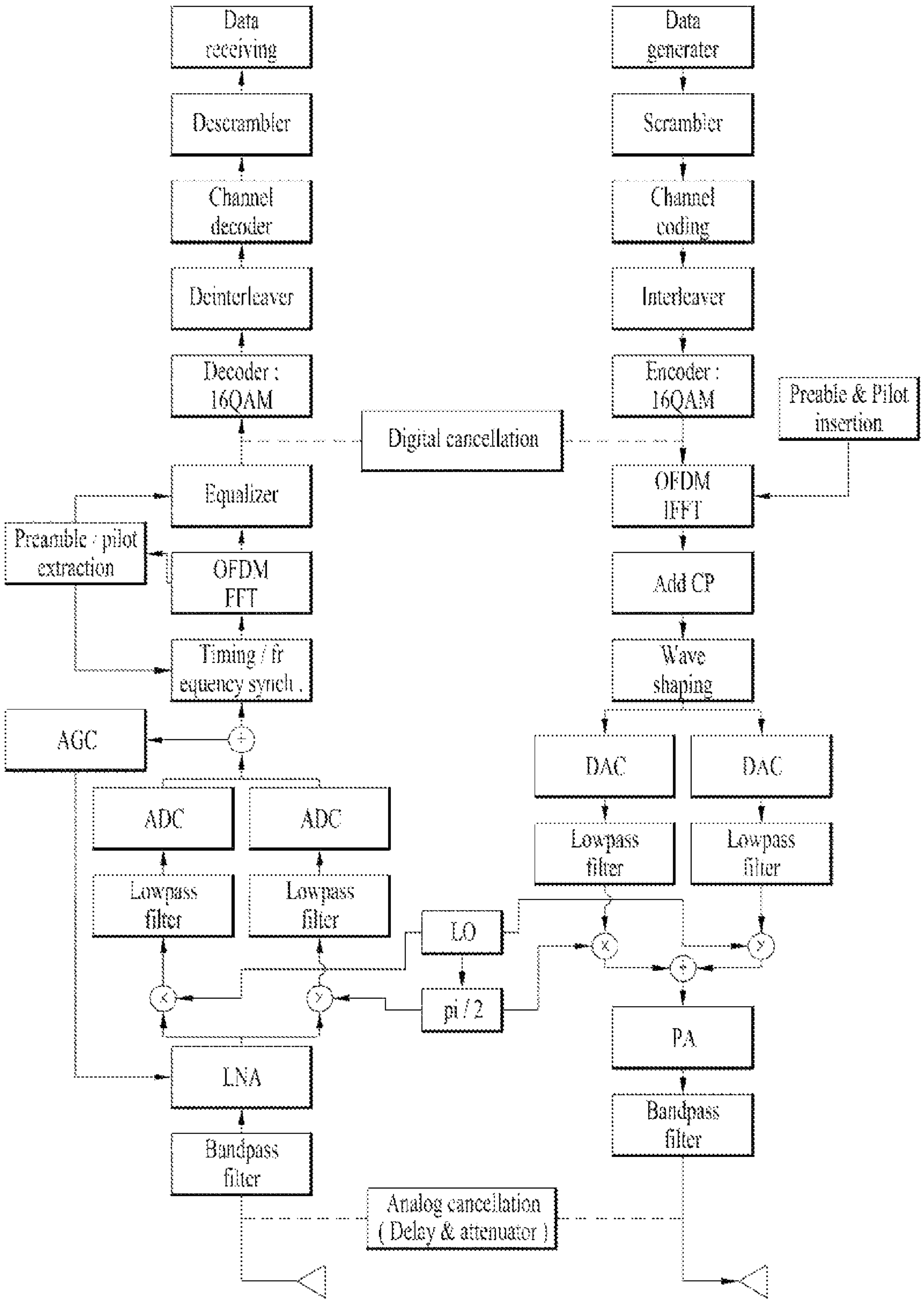

【Fig 8】
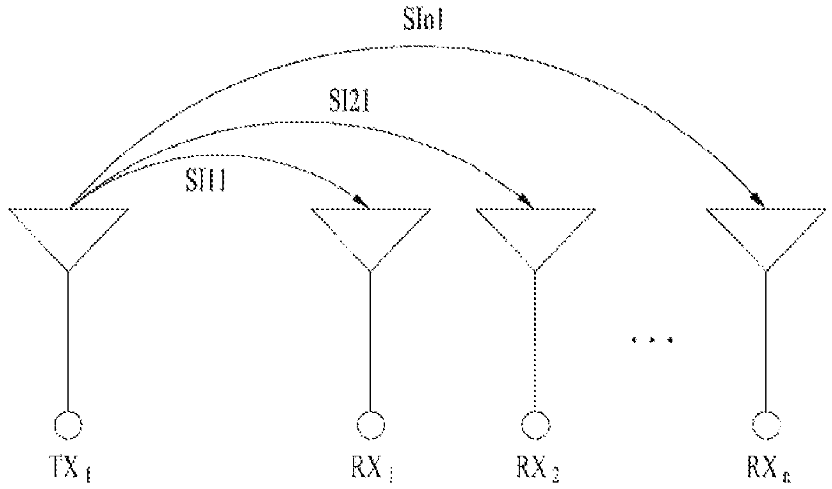
(a)
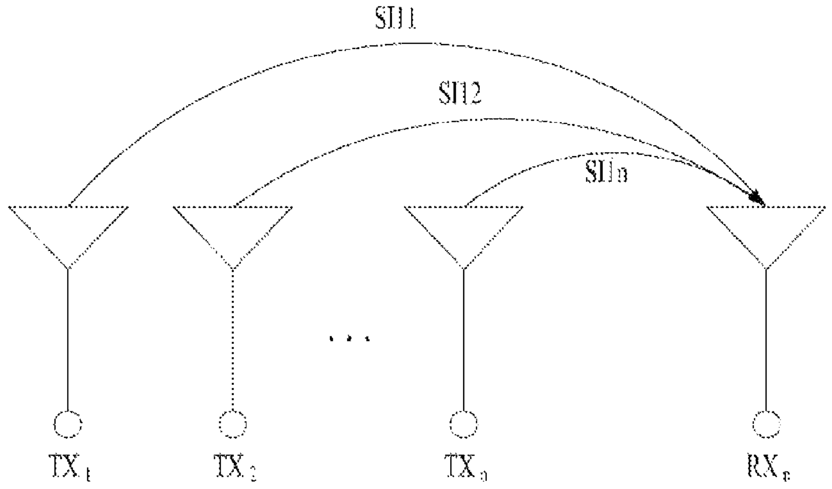
(b)

【Fig 9】
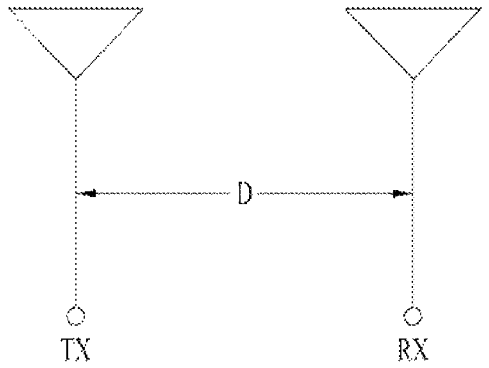
【Fig 10】
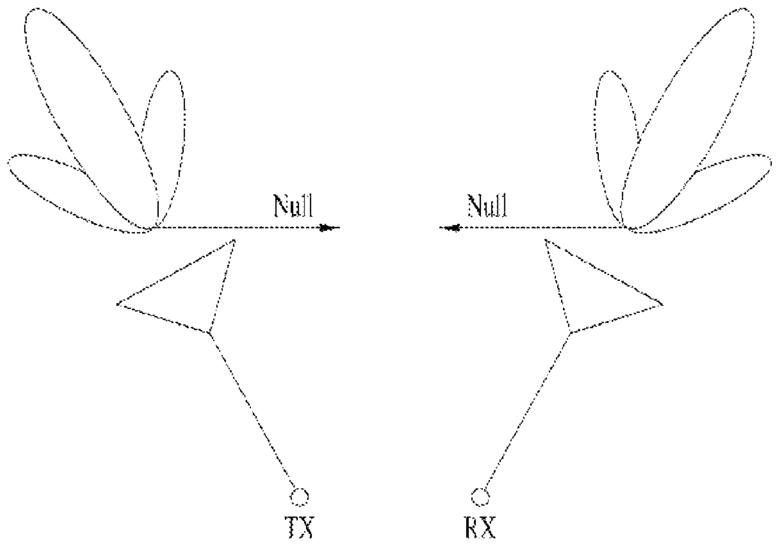
【Fig 11】
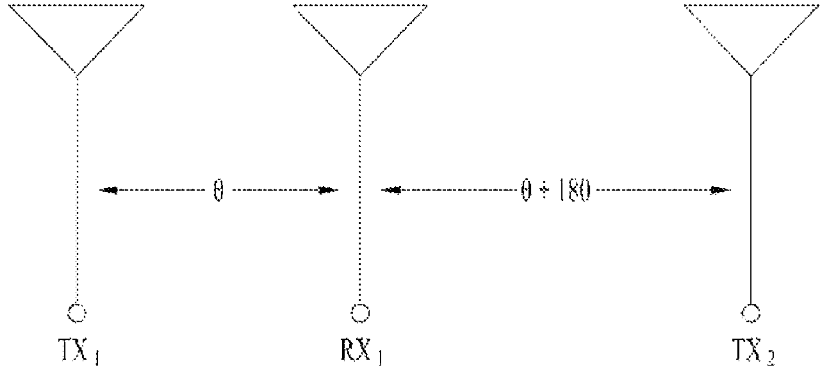

【Fig 12】
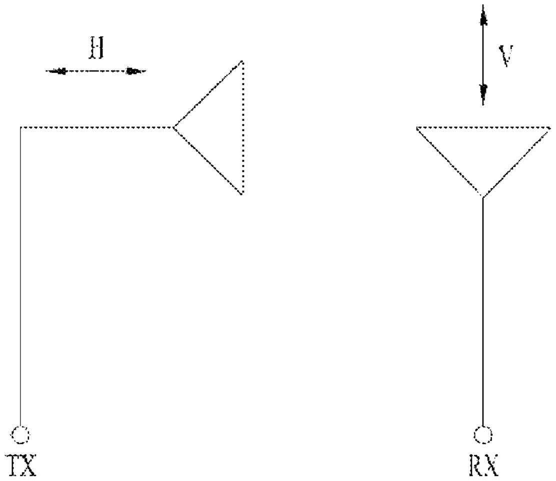
【Fig 13】
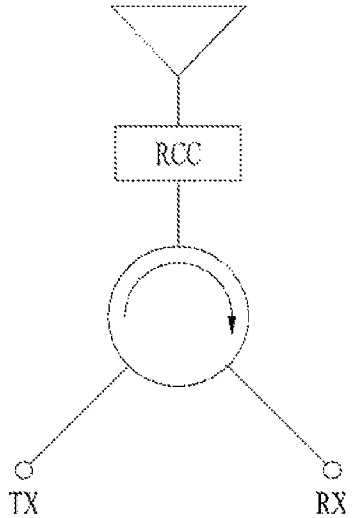

【Fig 14】
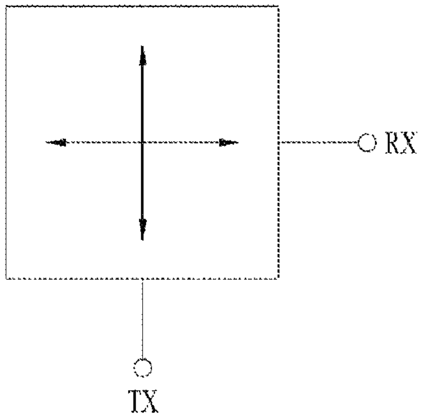

【Fig 15】
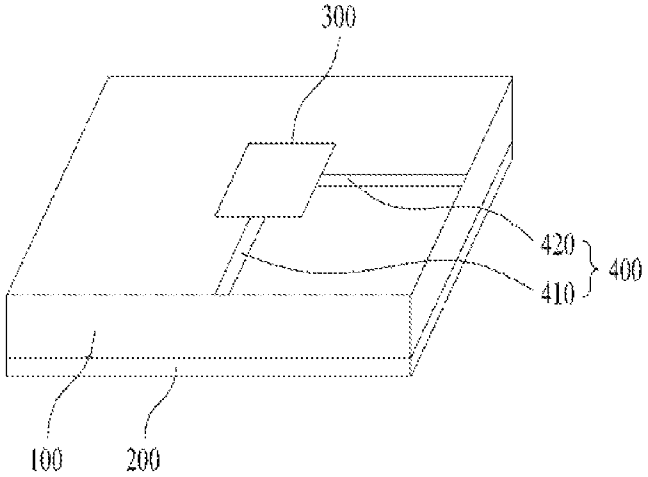
【Fig 16】
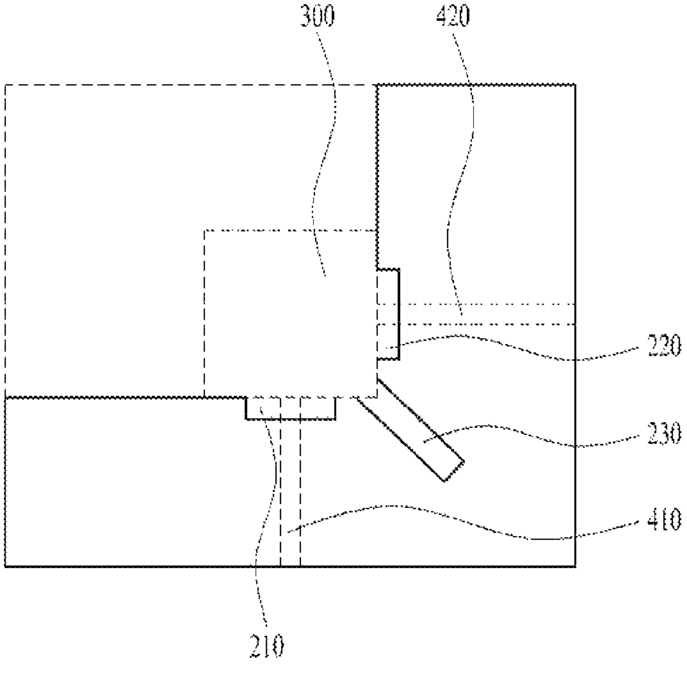

【Fig 17】
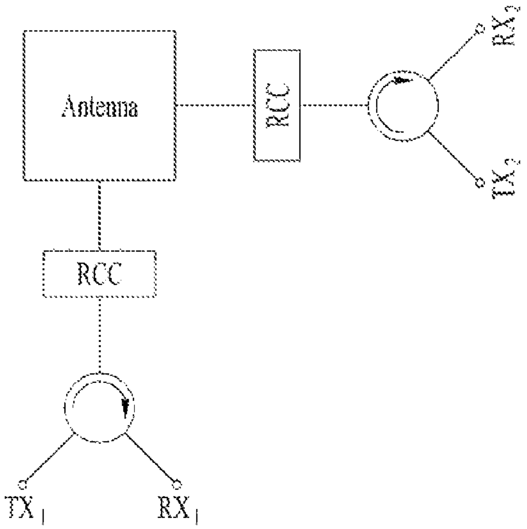

【Fig 18】
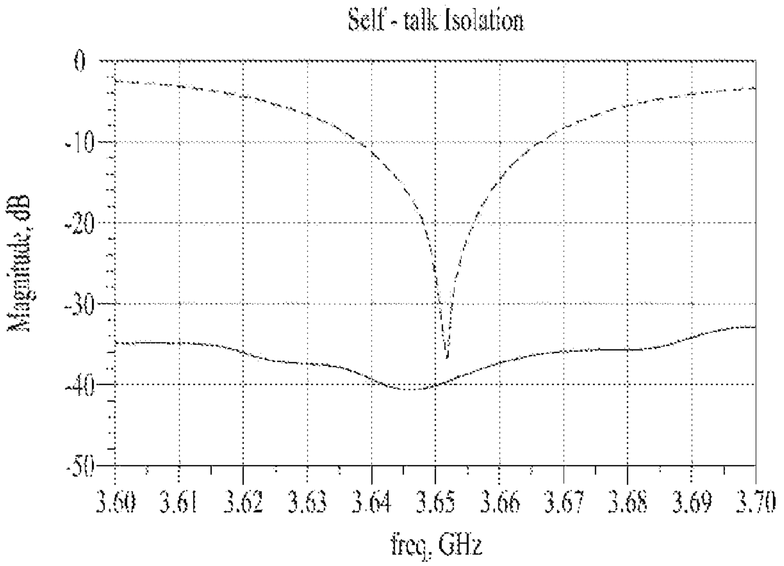
(a)
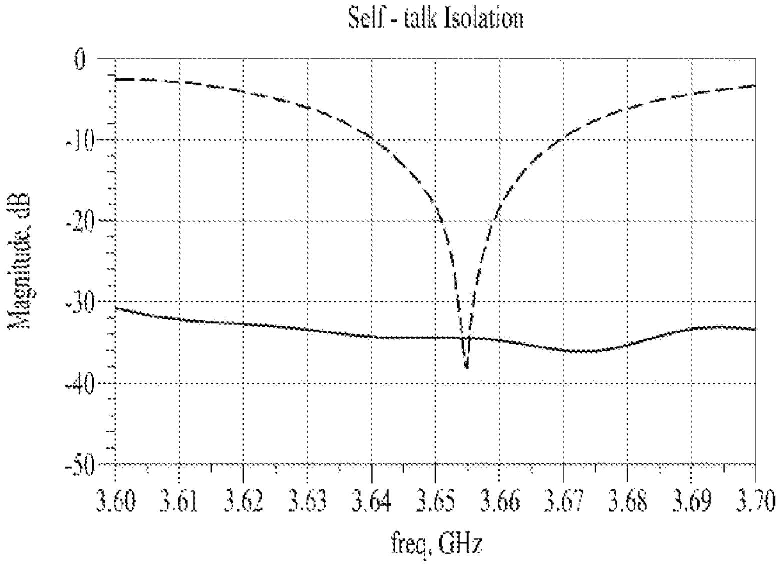
(b)

【Fig 19】
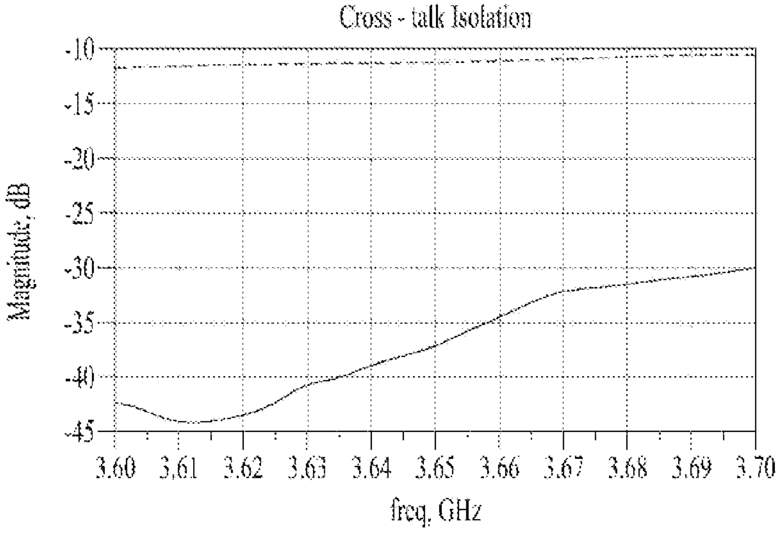
(a)
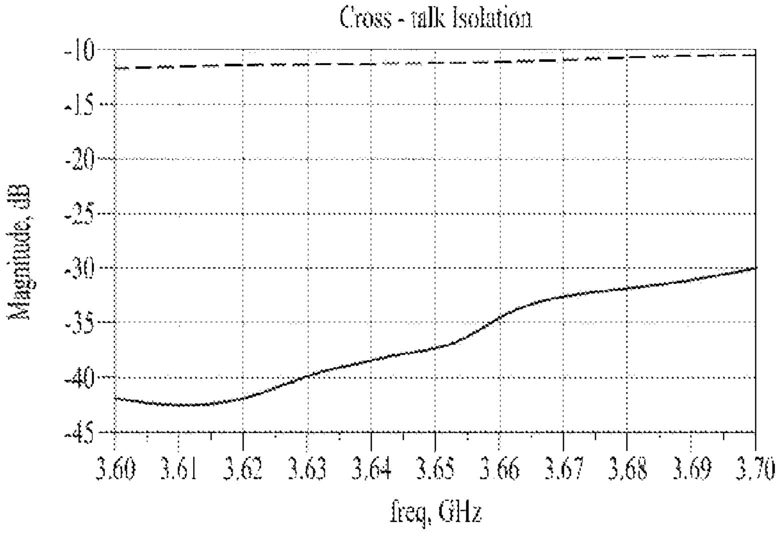
(b)

BROADBAND PATCH ANTENNA

CROSS-REFERENCE TO RELATED APPLICATIONS

This application is the National Stage filing under 35 U.S.C. 371 of International Application No. PCT/KR2019/013674, filed on Oct. 17, 2019, the contents of which is hereby incorporated by reference herein in its entirety.

TECHNICAL FIELD

The present disclosure relates to wireless communication, and more specifically, to a broadband patch antenna for improving isolation between ports in order to remove a self-interference signal in a system supporting full duplex radio (FDR).

BACKGROUND ART

Compared to conventional half duplex communication in which time or frequency resources are divided orthogonally, full-duplex communication doubles a system capacity in theory by allowing a node to perform transmission and reception simultaneously.

FIG. 1 is a conceptual diagram of a UE and a base station (BS) which support full-duplex radio (FDR).

In the FDR situation illustrated in FIG. 1, the following three types of interference are produced.

Intra-device self-interference: Because transmission and reception take place using the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among these three types of interference, intra-device self-interference (hereinafter referred to as self-interference (SI)) occurs only in the FDR system and significantly deteriorates the performance of the FDR system, and thus it is the first problem that needs to be solved in order to operate the FDR system.

DISCLOSURE

Technical Task

One technical task of the present disclosure is to provide a broadband patch antenna having a high degree of self-interference signal cancellation by improving isolation between ports.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

According to one embodiment of the present disclosure, a broadband patch antenna includes a substrate, a ground plate attached to one surface of the substrate, a radiation plate attached to the center of the other surface facing the one surface of the substrate, and a feed line attached to the other surface of the substrate and having one end connected to the radiation plate.

The feed line may include a first line and a second line, the ground plate may have an "L" shape having a first groove, a second groove, and a third groove, and the ground plate may not include a portion corresponding to the radiation plate.

The first groove may be located in a first portion corresponding to a connecting portion of the first line and the radiation plate, the second groove may be located in a second portion corresponding to a connecting portion of the second line and the radiation plate, and the third groove may be located to be spaced apart from the first groove and the second groove.

Further, the third groove may be located between the first groove and the second groove.

The third groove may be located in a portion of the ground plate which generates right handed circular polarization (RHCP) when a vertical polarization signal is input to the radiation plate through the feed line.

Further, the third groove may be located in a portion of the ground plate which generates left handed circular polarization (LHCP) when a horizontal polarization signal is input to the radiation plate through the feed line.

The first line and the second line may form a right angle.

The radiation plate may have a rectangular shape, one end of the first line may be connected to one side of the radiation plate, and one end of the second line may be connected to a side connected to the one side of the radiation plate.

The radiation plate may have a rectangular shape, and the third groove may be located at a portion bent at 90 degrees in the "L" shape.

Advantageous Effects

It is possible to improve polarization isolation of a patch antenna by forming the third groove in the ground plate according to an example of the present disclosure.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

FIG. 1 illustrates the concept of a UE and an eNB supporting FDR.

FIG. 2 illustrates a communication system applied to the present disclosure.

FIG. 3 illustrates wireless devices applicable to the present disclosure.

FIG. 4 illustrates another example of wireless devices applied to the present disclosure.

FIG. 5 is a diagram showing the concept of a transmission/reception link and self-interference (SI) in an FDR communication situation.

FIG. 6 is a diagram illustrating positions at which three self-IC schemes are applied, in a radio frequency (RF) Tx and Rx end (or an RF front end) of a device.

FIG. 7 is a block diagram of a self-IC device in a proposed communication apparatus in an OFDM communication environment based on FIG. 6.

FIG. 8 is a diagram for describing a method of canceling a self-interference signal by generating a duplicate signal.

FIG. 9 is a diagram for describing a method of canceling a self-interference signal using a physical distance of an antenna.

FIG. 10 is a diagram for describing a method of canceling a self-interference signal using a direction of an antenna beam.

FIG. 11 is a diagram for describing a method of canceling a self-interference signal using antenna arrangement.

FIG. 12 is a diagram for describing a method of canceling a self-interference signal by differentiating polarizations of a transmit antenna and a receive antenna.

FIG. 13 is a diagram for describing a method of canceling a self-interference signal using a circulator.

FIG. 14 is a diagram for describing a method of canceling a self-interference signal using antenna polarization.

FIG. 15 illustrates a broadband patch antenna.

FIG. 16 illustrates a ground plate of the broadband patch antenna.

FIG. 17 shows a circuit in which a broadband patch antenna, an RCC, and a circulator are combined.

FIG. 18 is a diagram illustrating self-talk self-interference signal cancellation effect using the RCC.

FIG. 19 is a diagram illustrating cross-talk self-interference signal cancellation effect using the third groove.

BEST MODE FOR DISCLOSURE

Reference will now be made in detail to the preferred embodiments of the present disclosure, examples of which are illustrated in the accompanying drawings. The detailed description set forth below in conjunction with the appended drawings is intended to describe exemplary embodiments of the present disclosure and is not intended to represent only the embodiments in which the present disclosure can be implemented.

In the following detailed description of the disclosure includes details to help the full understanding of the present disclosure. Yet, it is apparent to those skilled in the art that the present disclosure can be implemented without these details.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

Moreover, in the following description, specific terminologies are provided to help the understanding of the present disclosure. And, the use of the specific terminology can be modified into another form within the scope of the technical idea of the present disclosure.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 2 illustrates a communication system 1 applied to the present disclosure.

Referring to FIG. 2, the communication system 1 applied to the present disclosure includes wireless devices, BSs, and a network. The wireless devices refer to devices performing communication by radio access technology (RAT) (e.g., 5G new RAT (NR) or LTE), which may also be called communication/radio/5G devices. The wireless devices may include, but no limited to, a robot **100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200*a*** may operate as a BS/network node for other wireless devices.

The wireless devices **100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured by using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100***a* to 100*f*.

Wireless communication/connections 150*a*, 150*b*, or 150*c* may be established between the wireless devices 100*a* to 100*f* and the BSs 200, or between the BSs 200. Herein, the wireless communication/connections may be established through various RATs (e.g., 5G NR) such as UL/DL communication 150*a*, sidelink communication 150*b* (or, D2D communication), or inter-BS communication 150*c* (e.g. relay, integrated access backhaul (IAB)). A wireless device and a BS/a wireless devices, and BSs may transmit/receive radio signals to/from each other through the wireless communication/connections 150*a*, 150*b*, and 150*c*. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

FIG. 3 illustrates wireless devices applicable to the present disclosure.

Referring to FIG. 3, a first wireless device 100 and a second wireless device 200 may transmit radio signals through a variety of RATs (e.g., LTE and NR). Herein, {the first wireless device 100 and the second wireless device 200} may correspond to {the wireless devices 100*a* to 100*f* and the BSs 200} and/or {the wireless devices 100*a* to 100*f* and the wireless devices 100*a* to 100*f*} of FIG. 2.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

FIG. 4 illustrates another example of wireless devices applied to the present disclosure. The wireless devices may be implemented in various forms according to use-cases/services (refer to FIG. 2).

Referring to FIG. 4, wireless devices 100 and 200 may correspond to the wireless devices 100 and 200 of FIG. 3 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 3. For example, the transceiver(s) 114 may include the one or more transceivers 106 and 206 and/or the one or more antennas 108 and 208 of FIG. 3. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100*a* of FIG. 2), the vehicles (100*b*-1 and 100*b*-2 of FIG. 2), the XR device (100*c* of FIG. 2), the hand-held device (100*d* of FIG. 2), the home appliance (100*e* of FIG. 2), the IoT device (100*f* of FIG. 2), a digital broadcasting terminal, a hologram device, a public safety device, an MTC device, a medicine device, a FinTech device (or a finance device), a security device, a climate/environment device, the AI server/device (400 of FIG. 2), the BSs (200 of FIG. 2), a network node, etc. The wireless device may be mobile or fixed according to a use-case/service.

In FIG. 4, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled by wire, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

FIG. 5 is a diagram showing the concept of a transmission/reception link and self-interference (SI) in an FDR communication situation.

As shown in FIG. 5, SI may be divided into direct interference caused when a signal transmitted from a transmit antenna directly enters a receive antenna without path attenuation, and reflected interference reflected by peripheral topology, and the level thereof is dramatically greater than a desired signal due to a physical distance difference. Due to the dramatically large interference intensity, efficient self-IC is necessary to operate the FDR system.

To effectively operate the FDR system, self-IC requirements with respect to the maximum transmit power of devices (in the case where FDR is applied to a mobile communication system (BW=20 MHz)) may be determined as illustrated in Table 1 below.

TABLE 1

| Node Type | Max. Tx Power ($P_A$) | Thermal Noise. (BW = 20 MHz) | Receiver NF | Receiver Thermal Noise Level | Self-IC Target ($P_A$-TN-NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

Referring to Table 1, it may be noted that to effectively operate the FDR system in a 20-MHz BW, a UE needs 119-dBm self-IC performance. A thermal noise value may be changed to $N_{0,BW}$=−174 dBm+10×$\log_{10}$(BW) according to the BW of a mobile communication system. In [Table 1], the thermal noise value is calculated on the assumption of a 20-MHz BW. In relation to [Table 1], for receiver noise figure (NF), a worst case is considered referring to the 3GPP specification requirements. Receiver thermal noise level is determined to be the sum of a thermal noise value and a receiver NF in a specific BW.

Types of Self-IC Schemes and Methods for Applying the Self-IC Schemes

FIG. 6 is a diagram illustrating positions at which three self-IC schemes are applied, in a radio frequency (RF) Tx and Rx end (or an RF front end) of a device. Now, a brief description will be given of the three self-IC schemes.

Antenna Self-IC: Antenna self-IC is a self-IC scheme that should be performed first of all self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an analog-to-digital convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital self-IC. However, since digital self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital self-IC FIG. 7 is a block diagram of a self-IC device in a proposed communication apparatus in an OFDM communication environment based on FIG. 6.

While FIG. 7 shows that digital self-IC is performed using digital SI information before Digital to Analog Conversion (DAC) and after ADC, it may be performed using a digital SI signal after inverse fast Fourier transform (IFFT) and before fast Fourier transform (FFT). Further, although FIG. 7 is a conceptual diagram of self-IC though separation of a Tx antenna from an Rx antenna, if antenna self-IC is performed using a single antenna, the antenna may be configured in a different manner from in FIG. 7.

In multiple-input multiple-output (MIMO) full duplex radio (FDR), self-interference signals may be divided into two types. More specifically, self-interference signals may include self-talk interference in which a transmission port TX_N of an antenna N is coupled to a reception port RX_N of the antenna N, and cross-talk interference in which TX_N is coupled to RX_M.

Here, being coupled refers to a phenomenon in which AC signal energy is electrically/magnetically transmitted between independent spaces or lines. That is, energy can be exchanged between a transmit antenna and a receive antenna present in independent spaces according to coupling, and thus an interference signal may be generated.

The above-described self-interference signal cancellation methods for canceling self-interference signals will be described in more detail.

FIG. 8 is a diagram for describing a method of canceling a self-interference signal by generating a duplicate signal.

FIG. 8(*a*) illustrates self-interference signals generated between one transmit antenna TX1 and a plurality of receive antennas RX1, RX2, and RXn. In addition, FIG. 8(*b*) illustrates self-interference signals generated between a plurality of transmit antennas TX1, TX2, and TXn and one receive antenna RX1.

In order to cancel self-interference signals SI generated between multiple antennas, duplicate signals identical to the self-interference signals may be generated and added to a signal received by a receive antenna. However, in multi-antenna environments as shown in FIG. 8, the number of types of self-interference signals to be considered increases, which may increase implementation complexity.

FIG. 9 is a diagram for describing a method of canceling a self-interference signal using a physical distance of an antenna.

Referring to FIG. 9, there may be a physical distance "D" between a transmit antenna TX and a receive antenna RX. Due to this physical distance, free space loss may occur in a signal transmitted from the transmit antenna to the receive antenna. According to the free space loss, the signal radiated from the TX antenna is attenuated in inverse proportion to the square of the distance. Accordingly, a self-interference signal can be canceled by sufficiently increasing the distance between the transmit antenna and the receive antenna.

However, the method of adjusting the physical length of an antenna requires a sufficient distance between antennas in order to obtain a high degree of self-interference signal cancellation. Accordingly, in the case of MIMO communication using multiple antennas, there is a problem in that the size of an antenna module excessively increases.

FIG. 10 is a diagram for describing a method of canceling a self-interference signal using a direction of an antenna beam.

Referring to FIG. 10, a signal of a transmit antenna is not transmitted in a null direction of an antenna beam. Accordingly, self-interference signals can be canceled by locating a receive antenna in the null direction of the transmit antenna and locating the transmit antenna in the null direction of the receive antenna.

However, in the case of an actual antenna, a signal may be transmitted in the null direction and thus the self-interference signal cancellation method using the direction of an antenna beam has a limit in self-interference cancellation performance. In addition, since a receive antenna needs to be disposed at a null position of a transmit antenna beam and a transmit antenna needs to be disposed at a null position of a receive antenna beam, there is a limitation in beam direction adjustment. That is, when the method of canceling a self-interference signal using the direction of an antenna beam is used, a self-interference signal can be canceled but beam steering is limited. Further, since a transmit antenna and a receive antenna cannot face the same direction, channels of the transmit antenna and the receive antenna are different from each other. Therefore, this method can be applied to a relay, but it is not suitable for a general communication situation.

FIG. 11 is a diagram for describing a method of canceling a self-interference signal using antenna arrangement.

Referring to FIG. 11, when a self-interference signal generated between a transmit antenna 1 TX1 and a receive antenna 1 RX1 has a phase of 0 degrees, a transmit antenna 2 TX2 is arranged such that a self-interference signal generated between the transmit antenna 2 TX2 and the receive antenna 1 RX1 has a phase of θ+180 degrees. In addition, the self-interference signals having a phase difference of 180 degrees are added at the receive antenna and thus can be canceled.

As another example, a plurality of transmit antennas may be arranged in a circle around one receive antenna.

However, in the case of the method using antenna arrangement, antennas need to be arranged such that a phase difference between self-interference signals is 180 degrees. Accordingly, as the number of antennas increases, the size of a self-interference signal cancellation circuit increases due to antenna arrangement.

FIG. 12 is a diagram for describing a method of canceling a self-interference signal by differentiating polarizations of a transmit antenna and a receive antenna.

Referring to FIG. 12, a transmit antenna TX transmits a horizontal polarization signal, and a receive antenna RX receives a vertical polarization signal. Accordingly, isolation can be increased compared to a case where the transmit antenna and the receive antenna use polarized waves in the same direction.

However, this method may limit antenna arrangement in a communication module because the transmit antenna and the receive antenna are separated.

FIG. 13 is a diagram for describing a method of canceling a self-interference signal using a circulator.

Referring to FIG. 13, a self-interference signal can be canceled by connecting a circulator having isolation between ports to a mono polarization antenna.

The circulator may be connected to a shared antenna that simultaneously transmits and receives signals to serve to separate a transmitted signal from a received signal. Here, the circulator is a non-reciprocal element using magnetism and may have isolation between ports. Since commercially available circulator elements generally have isolation between ports of −15 to −20 dB, the isolation of commercial circulator elements does not reach isolation required for an antenna stage.

In order to improve isolation between ports of the circulator, a reflection coefficient controller (RCC) may be provided between the circulator and the antenna. The RCC improves the isolation between ports of the circulator by changing the reflection coefficient when the antenna is viewed from the circulator. A self-talk signal leaked from a transmit (TX) port to a receive (RX) port can be represented as the sum of a signal directly leaked and a signal reflected by the antenna port. The RCC can make the signal reflected by the antenna port into a signal of the same magnitude with a phase difference of 180 degrees from the signal directly leaked. Therefore, the self-talk signal can be removed by the RCC.

FIG. 14 is a diagram for describing a method of canceling a self-interference signal using antenna polarization.

Referring to FIG. 14, a patch antenna may have a total of two linear polarizations in a signal input direction. The patch antenna is the most common type of printed antenna and refers to an antenna composed of a thin rectangular metal patch plate on a thin dielectric material having a low loss factor. In FIG. 14, an arrow in the vertical direction indicates polarization of a TX signal and an arrow in the horizontal direction indicates polarization of an RX signal. These two linear polarizations can be orthogonal to each other. Theoretically, a receiving end and a transmitting end using orthogonal polarizations do not exchange signals with each other. Accordingly, the patch antenna receiving end and transmitting end can cancel a self-interference signal by using signals of different polarizations.

However, when an antenna module for full-duplex communication is formed using a patch antenna and an RCC, a self-interference signal cancellation frequency band of the RCC is limited because the patch antenna has a narrow impedance matching frequency band. Therefore, in order to form an antenna module for full-duplex communication having a wide operating frequency band, it is necessary to design a patch antenna having a wide impedance matching frequency and a high degree of cross-talk cancellation.

FIG. 15 illustrates a broadband patch antenna.

Referring to FIG. 15, a broadband patch antenna according to an example includes a substrate 100, a ground plate 200, a radiation plate 300, and a feed line 400.

The ground plate 200 may be formed of a thin metal plate. The substrate 100 may be implemented as a printed circuit board (PCB) and may have a thin plate shape made of an insulator or dielectric. In addition, one surface of the substrate 100 may be in contact with the ground plate 200 and the other surface of the substrate 100 may be in contact with the radiation plate 300 and the feed line 400.

The radiation plate 300 may be formed of a rectangular thin metal plate or may be formed of a metal piece having various shapes such as a circle, an oval, and a triangle. A current flows through the surface of the radiation plate 300 that has received a signal through the feed line 400, and the signal may be radiated due to the current on the surface of the radiation plate 300. The radiation plate 300 may be generally formed of a metal having a resistance of about 50 ohms.

The feed line 400 serves to transmit/receive signals to/from the radiation plate 300. When a signal is supplied to the radiation plate 300 through the feed line 400, the radiation plate 300 and the ground plate 200 form a resonator at a specific frequency. The feed line 400 may include a first line 410 and a second line 420. One end of the first line 410 of the feed line 400 may be connected to one side of the radiation plate 300, and one end of the second line 420 may be connected to a side connected to the one side of the radiation plate 300. Further, the first line 410 and the second line 420 may be formed to form a right angle.

FIG. 16 illustrates the ground plate of the broadband patch antenna.

FIG. 16 is a plan view of the broadband patch antenna. Referring to FIG. 16, the radiation plate 300 and the feed line 400 are indicated by a dotted line and the ground plate 200 is indicated by a solid line in order to show the shape of the ground plate corresponding to the radiation plate 300 and the feed line 400.

The ground plate 200 may have an "L" shape that does not include a portion corresponding to the radiation plate 300. Due to the "L" shape, the patch antenna has a broadband impedance matching characteristic.

The broadband impedance matching characteristic due to the "L" shape will be described in more detail. The operating frequency band of the patch antenna is related to the distance between the radiation plate and the ground plate and relative permittivity among the physical properties of the substrate. The longer the distance between the radiation plate and the ground plate and the lower the relative permittivity, the wider the operating frequency band of the patch antenna. When a portion of the ground plate 200 facing the radiation plate 300 is removed, the vertical distance from the radiation plate 300 to the ground plate 200 becomes infinite, and thus the operating frequency band of the patch antenna can increase.

However, the patch antenna from which a part of the ground plate 200 has been removed may not be impedance matched to 50Ω. Therefore, an impedance matching process is required. Although a quarter wave transformer or an inset-fed method may be used, in general, impedance matching can be performed using a method of forming a groove in the ground plate 200 in one example of the present disclosure.

In the ground plate 200, a first groove 210 may be formed in a portion facing one end of the first line 410 and a second groove 220 may be formed in a portion facing one end of the second line 420. The first groove 210 and the second groove 220 may be modeled as a series inductor and a shunt capacitor and serve to match the impedance of the patch antenna to 50Ω.

Polarization of the antenna is determined by current distribution on the surface of the radiation plate 300. More specifically, a signal radiated from the radiation plate has vertical polarization when a current vibrating in the vertical direction flows on the surface of the radiation plate, and a signal radiated from the radiation plate has horizontal polarization when a current vibrating in the horizontal direction flows on the surface of the radiation plate. When the first groove 210 and the second groove 220 are formed in the ground plate 200, and impedance matching is performed, the polarization isolation characteristic of the antenna may deteriorate because current distribution on the surface of the radiation plate changes due to the first and second grooves.

In general, the current on the surface of the radiation plate oscillates in the direction in which a signal is applied to the patch antenna. In the case of a rectangular ground plate having no removed portion, the ground plate 200 is symmetrical with respect to the first line 410 and the second line 420 of the feed line 400. Accordingly, the current on the surface of the radiation plate oscillates in the same direction in which a signal is applied to the antenna, and the radiation plate generates linear polarization.

However, when the "L"-shaped ground plate 200 is formed for broadband impedance matching, the ground plate 200 is not symmetrical with respect to the first line 410 and the second line 420 of the feed line. Therefore, the direction of the current flowing on the surface of the radiation plate may be different from the vibration direction of an applied signal. For example, even when a signal is applied to the radiation plate in the vertical direction, the surface current of the radiation plate may have a component that oscillates in the horizontal direction. In addition, even when a signal is applied to the radiation plate in the horizontal direction, the surface current of the radiation plate may have a component that oscillates in the vertical direction. Therefore, the radiation plate radiates a radiation signal having both vertical polarization and horizontal polarization, and thus polarization isolation deteriorates and isolation between ports also deteriorates. Accordingly, it is necessary to adjust current distribution on the surface of the antenna in order to increase isolation between antenna ports.

In order to control the current distribution on the surface of the antenna, a method of changing the shape of the antenna may be used. However, if the shape of the antenna is changed, the symmetrical shape of the antenna may not be maintained. When MIMO is applied, a problem may occur in antenna arrangement, and antenna impedance matching and antenna gain may change.

In an example of the present disclosure, it is possible to improve the polarization isolation characteristic while maintaining the symmetrical structure of the antenna by forming a third groove 230 in the ground plate 200. By forming the third groove 230 in the ground plate 200, the current flowing through the surface of the radiation plate 300 can be changed by changing the direction of the current flowing through the ground plate 200. Accordingly, the polarization isolation of the antenna can be improved. The third groove 230 may be designed with reference to the current characteristics of the actual patch antenna and may be formed by removing a portion of the ground plate that generates unintended polarization.

Left handed circular polarization (LHCP) may occur when a signal is applied to the patch antenna having the "L"-shaped ground plate 200 in the vertical direction, and right handed circular polarization (RHCP) may occur when a signal is applied in the horizontal direction. Since the ground plate 200 is not symmetrical with respect to the first line 410 and the second line 420, a current having two components having different phases flows on the surface of the radiation plate 300. Accordingly, the patch antenna having the "L"-shaped ground plate radiates different circular polarized waves rather than linearly polarized waves.

When a signal is applied to the patch antenna in the vertical direction, current may oscillate in the vertical→horizontal→vertical directions over time. When a signal is applied to the patch antenna in the horizontal direction, current may oscillate in the horizontal→vertical→horizontal directions. These signals have orthogonal polarizations every moment, and isolation between ports is maintained according to these orthogonal polarizations. However, due to the asymmetry of the ground plate, some current that creates an RHCP component exists on the surface of the antenna even when a signal in the vertical direction is applied, and vice versa. Therefore, it is possible to remove unwanted current and improve polarization isolation by removing the ground plate below an antenna surface current region that creates RHCP polarization when a vertical direction signal is applied and creates an LHCP component when a horizontal direction signal is applied to form a groove. In an example of the present disclosure, isolation between ports can be improved by forming the third groove 230. The third groove 230 may be formed to be spaced apart from the first groove 210 and the second groove 220 and may be formed between the first line 410 and the second line 420 facing each other. In addition, the third groove 230 may be formed in a portion generating RHCP when a vertical polarization signal is input to the radiation plate 300. In addition, the third groove 230 may be formed in a portion generating LHCP when a horizontal polarization signal is input to the radiation plate 300. In addition, the third groove 230 may be formed at a position at which the symmetry of the ground plate 200 is maintained as much as possible. When the substrate 100 has a rectangular shape, the third groove 230 may be formed in a diagonal direction of the substrate 100. Alternatively, the third groove 230 may be formed in a diagonal direction of the radiation plate 300. Although the shape of the third groove 230 is represented in the most general rectangular shape in FIG. 16, it may be formed in various shapes such as a circle, an ellipse, and a triangle.

FIG. 17 shows a circuit in which a broadband patch antenna, an RCC, and a circulator are combined.

A ground plate is formed in an "L" shape, and the first groove, the second groove, and the third groove are formed to manufacture a broadband patch antenna achieving impedance matching in a wide frequency band and having a high degree of cross-talk self-interference signal cancellation. Accordingly, a patch antenna for FDR suitable for coupling to an RCC can be formed.

FIG. 18 is a diagram illustrating a self-talk self-interference signal cancellation effect using an RCC.

FIG. 18(*a*) is a diagram illustrating a degree of self-talk self-interference signal cancellation of antenna port 1, and FIG. 18(*b*) is a diagram illustrating a degree of self-talk self-interference signal cancellation of antenna port 2.

Referring to FIGS. 18(*a*) and 18(*b*), curves represented by dotted lines show degrees of self-interference signal cancellation of a patch antenna to which only a circulator is coupled without an RCC. In addition, curves represented by solid lines show degrees of self-interference signal cancellation of a patch antenna to which the RCC and the circulator are coupled. The patch antenna having the RCC coupled thereto has a higher degree of self-talk self-interference signal cancellation over a wider frequency band than the patch antenna without the RCC.

FIG. 19 is a diagram illustrating the cross-talk self-interference signal cancellation effect using the third groove.

FIG. 19 (*a*) is a diagram illustrating a degree of cross-talk self-interference signal cancellation of antenna port 1, and FIG. 19 (*b*) is a diagram illustrating a degree of cross-talk self-interference signal cancellation of antenna port 2.

Referring to FIGS. 19(*a*) and 19(*b*), dotted lines indicate degrees of cross-talk self-interference signal cancellation when the third groove is not formed in the ground plate, and solid lines indicate degrees of cross-talk self-interference signal cancellation when the third groove is formed in the ground plate. The patch antenna can have a high degree of self-interference signal cancellation over a wide frequency band by forming the third groove in the ground plate.

The examples described above are combinations of elements and features of the present disclosure in a predetermined form. Each component or feature should be considered optional unless explicitly stated otherwise. Each component or feature may be implemented in a form that is not combined with other components or features. It is also possible to combine some elements and/or features to constitute an example of the present disclosure. The order of operations described in the examples of the present disclosure may be changed. Some configurations or features of one example may be included in another example, or may be substituted for a corresponding configuration or feature of another example. It is obvious that claims that are not explicitly cited in the claims may be combined to form an example or may be included as a new claim by amendment after filing.

It is apparent to those skilled in the art that the present disclosure may be embodied in other specific forms without departing from the essential characteristics of the present disclosure. Accordingly, the above detailed description should not be construed as restrictive in all respects but as exemplary. The scope of the present disclosure should be determined by a reasonable interpretation of the appended claims, and all modifications within the equivalent scope of the present disclosure are included in the scope of the present disclosure.

INDUSTRIAL APPLICABILITY

Examples of the present disclosure may be applied to various wireless access systems. As an example of various wireless access systems, there is 3rd Generation Partnership Project (3GPP) or 3GPP2. Examples of the present disclosure can be applied not only to the various wireless access systems, but also to all technical fields to which the various wireless access systems are applied. Furthermore, the proposed method can be applied to a mmWave communication system using a very high frequency band.

What is claimed is:

1. A broadband patch antenna comprising:

a substrate;

a ground plate attached to one surface of the substrate;

a radiation plate attached to the center of the other surface facing the one surface of the substrate; and a feed line attached to the other surface of the substrate and having one end connected to the radiation plate, wherein the feed line includes a first line and a second line, the ground plate has an "L" shape having a first groove, a second groove, and a third groove, the ground plate does not include a portion corresponding to the radiation plate, the first groove is located in a first portion corresponding to a connecting portion of the first line and the radiation plate, the second groove is located in a second portion corresponding to a connecting portion of the second line and the radiation plate, and the third groove is located to be spaced apart from the first groove and the second groove, and wherein the third groove is formed in a position where a plurality of different circular polarizations including a first circular polarization for a first phase current and a second circular polarization, having an opposite circular direction to the first circular polarization, for a second phase current occur, and wherein the radiation plate has a first rectangular shape, the third groove has a second rectangular shape, and the third groove having the second rectangular shape is formed in a diagonal direction with respect to the radiation plate having the first rectangular shape.

2. The broadband patch antenna of claim 1, wherein the third groove is located between the first groove and the second groove.

3. The broadband patch antenna of claim 1, wherein the first circular polarization is right handed circular polarization (RHCP), and the first phase current is related to a vertical polarization signal input to the radiation plate through the feed line.

4. The broadband patch antenna of claim 1, wherein the second circular polarization is left handed circular polarization (LHCP), and the second phase current is related to a horizontal polarization signal input to the radiation plate through the feed line.

5. The broadband patch antenna of claim 1, wherein the first line and the second line form a right angle.

6. The broadband patch antenna of claim 1, wherein one end of the first line is connected to one side of the radiation plate, and one end of the second line is connected to a side connected to the one side of the radiation plate.

* * * * *